Feb. 2, 1932.  W. P. STUNZ  1,843,845
TELEPHONIC INSTRUMENT FOR REPRODUCING SOUND VIBRATIONS
Filed Sept. 29, 1928
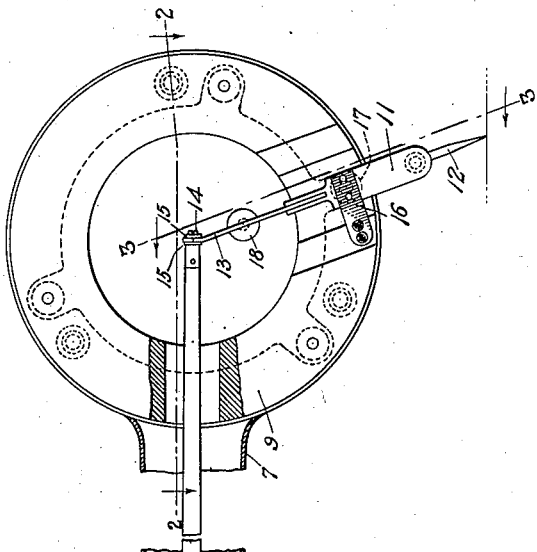
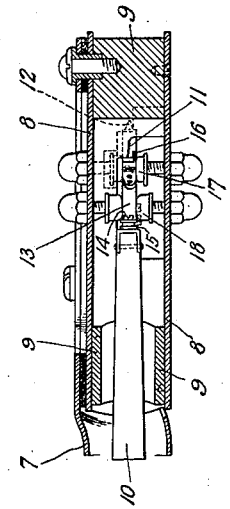
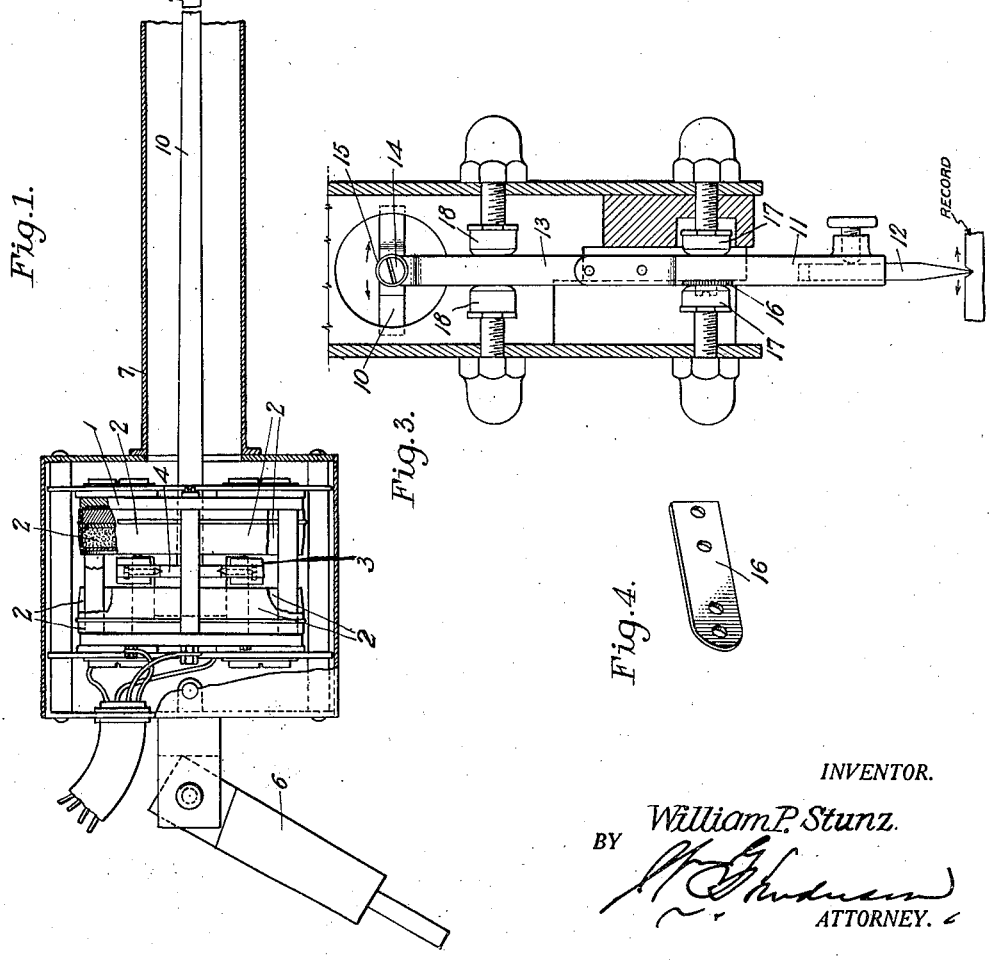
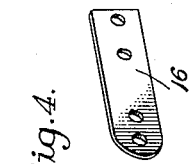
INVENTOR.
William P. Stunz.
BY
ATTORNEY.

Patented Feb. 2, 1932

1,843,845

UNITED STATES PATENT OFFICE

WILLIAM PRESTON STUNZ, OF LANSDOWNE, MARYLAND, ASSIGNOR TO SAFE DEPOSIT AND TRUST COMPANY OF BALTIMORE, A CORPORATION OF MARYLAND, TRUSTEE

TELEPHONIC INSTRUMENT FOR REPRODUCING SOUND VIBRATIONS

Application filed September 29, 1928. Serial No. 309,263.

My invention relates to means for transmitting reproduced sound vibrations received more particularly from records, and has for its object to provide a construction designed to remove or eliminate the disagreeable and annoying "scratch" vibrations commonly occurring or arising from friction contact of the reproducing needle or stylus with the record. I have discovered that if these "scratch" vibrations be absorbed or eliminated so as not to be transmitted along with the sound vibrations, a clearer and more distinct reproduction of the true tone qualities of sound or wave vibrations, free from the objectionable and disconcerting metallic or "scratch" wave vibrations, will be the result.

From observation and experiments I have ascertained that the disconcerting metallic or "scratchy" vibrations are mainly, if not wholly, attributable to initial vibrations produced by friction between the tracer needle or stylus and the record and that if provision be made to absorb or dissipate these initial vibrations until they are eliminated or dissipated or overcome by the greater volume of reproduced vibrations received from the record, the "scratchy" vibrations will be practically unnoticeable or eliminated from the final delivery of the reproduced vibrations so that the final transmission and output of the vibrations will be clearer and free from the initial scratchy reproductions.

To effect this most desirable result, I have devised the means hereinafter particularly described and then sought to be clearly defined by the claims whereby these initial vibrations are taken care of by a "loss motion" formed substantially at the fulcrum of the needle bar or stylus so that only the greater dominating vibrations produced from the record are transmitted to the receiver or loud speaker, reference being had to the accompanying drawings forming part hereof and in which, Figure 1 is a side elevation of one form of embodiment of the invention, showing the manner of supporting the record reproducing needle or stylus and connecting it to a member carrying electrodes and granular carbon chambers, preferably of a multiplex type, some parts being in section and other parts omitted;

Figure 2 is a transverse longitudinal section on the line 2—2 of Figure 1;

Figure 3 is a vertical cross-section on the line 3—3 of Figure 1, on an enlarged scale;

Figure 4 is a perspective of the resilient support of the reproducing needle or stylus and associated parts.

In the accompanying drawings there is illustrated an instrument for transmission of record produced sound vibrations, the instrument being of the type embodying multiplex granular carbon transmitters from which an undulatory electrical current, alternately changing from positive to negative, is discharged over a line or conductor to a receiver located at a distributing point, the vibrations being derived from a record, such for instance as a gramophone or phonograph record, and wherein the amplitude of the vibrations recorded upon a record or disk will be reduced so as to be brought within the capacity of the granular carbon to transmit vibrations corresponding in amplitude to the original vibrations impressed or made upon the recording disk or member. Instruments of the general character mentioned have heretofore been made.

The present invention relates to improvements in such instruments whereby the vibrations imparted by the record to the stylus or reproducing needle at the initial stage of the vibrations, are so regulated or controlled that the vibrations which ordinarily cause or give rise to the disconcerting "scratchy" sounds experienced in the final output or discharge of sound vibrations are absorbed or dissipated by the later dominating sound vibrations so that the result will be the production of sound vibrations in volume clearer and more distinct and more closely corresponding to the original voice or otherwise caused vibrations impressed upon the reproducing record, and free from the metallic and discordant "scratchy" vibrations so often experienced in record reproduced or generated vibrations.

The invention may be used in connection with a multiplex transmitter having four granular carbon cells and corresponding number of movable electrodes and wiring for sending an undulatory alternating current to line or a receiver as illustrated for instance in Patent No. 943,915, granted December 21, 1909, or with a multiplex transmitter having eight granular carbon cells and a corresponding number of movable electrodes for sending an electrical undulatory alternating current of greater volume to line or a receiver, forming the subject of a pending application filed by me, but as the invention is not limited to either construction but applicable to both, I have not illustrated herein the wiring or electrical conductors for a multiplex transmitter of eight granular carbon cells as that does not constitute the subject of the present application. Accordingly, the drawings illustrate so much of a multiplex transmitter of the type mentioned as is necessary for a full understanding of the present invention, and in which the numeral 1 designates a frame carrying in the present instance eight granular carbon cells 2, and a corresponding number of stationary and also movable electrodes, the eight electrodes being carried by arms 3 of an oscillating spider 4, four electrodes being carried by each arm, located at opposite sides of the spider and adapted to coact with the granular carbon in the respective carbon cells 2.

The frame 1 is supported by a post 6 which will be rotatably supported by a table or bracket (not shown) so that the frame may swing back and forth under movements transmitted from the record needle or stylus, and will be hinged by a pivot or otherwise to the upper end of the post so as to rise and fall in a vertical plane to compensate for inequalities in the surface of the record disc or member.

From the front of the frame carrying the granular carbon cells and electrodes there extends a tubular member or arm 7 which supports at its forward end a casing or plates 8 containing a weight 9, which may be annular in form and which constitutes an inertia member which by reason of its mass or weight is non-responsive to a high rate of vibration and affords a relatively stable fulcruming support for attachment of the stylus or reproducing record needle, and which also serves to relieve the granular carbon in the cells of the transmitters from excessive disturbance that might otherwise arise from vibrations derived from the record through the stylus.

The oscillatory spider 4, which carries the electrodes for compressing the carbon granules in one cell and releasing the compression in another cell, in alternation, is oscillated through the instrumentality of an amplifying-reduction lever 10, of light weight material, preferably wood, which is attached at one end to the spider and has connected to its other end the stylus or reproducing needle carrying bar, consisting preferably of a bar 11 to which the stylus 12 is connected and a resilient strip 13 of thin metal or other suitable material, the upper end of which is attached, say by a screw 14 and elastic washers 15 to the end of the lever 10 whereby the vibrations received from the record are communicated to the granular carbon cells for electrical transmission to a receiver or loud speaker.

For the purpose of eliminating the objectionable "scratchy" vibrations hereinbefore mentioned, I provide, what, for convenience, I will designate as a "loss motion" support for the stylus needle bar, which is indicated by the numeral 16 and consists of a strip of relatively thin spring metal fixedly secured at one end, say to the inertia member 9, and having the other end free to vibrate, or unattached as illustrated in Figure 1 of the drawings, and to which the stylus or needle carrying bar 11 is secured. This resilient support for the stylus bar secured at one end only and free at the other end, flexes under the initial vibrations of the stylus due to friction between the stylus and record groove which if not restrained or controlled would be communicated to the granular carbon of the cells and transmitted to the receiver or loud speaker and produce the disturbing or "scratchy", metallic, sound waves previously mentioned. These initial vibrations are brought under control by adjustable cushioned fulcrum pads or bearings 17, disposed at opposite sides of the stylus or needle supporting arm preferably adjacent to the resilient support to which said bar is attached, as illustrated, the pads being adjustable by their screw threaded shanks engaging threads in the inertia member 9, or plates of its casing, as illustrated.

These fulcrum bearings are adjusted so that the initial vibrations will be taken up by the flexure of the resilient needle bar support and the needle bar caused to fulcrum on these bearing pads after or from the time the "loss motion" provided by the resilient support is passed so that the subsequent vibrations representing the dominating volume of sound vibrations will be transmitted by the needle bar to the lever through which vibrations reduced in amplitude are transmitted to the granular carbon of the transmitter cells and thus the purer and clearer sound vibrations are transmitted, free from the disturbing "scratch" vibrations, and sent forth to the receiver or loud speaker. The important feature of this part of the invention is the provision for the "loss motion" mentioned and the fulcrum bearing pads by which the initial "scratchy" vibrations are absorbed, dissipated, or suppressed, and practically only the dominant vibrations are transmitted or permitted to pass beyond the fulcrum of the stylus bar or reproducing needle. The value of having the resilient support of the needle or stylus bar free at one end is that the loss of power necessary to over come torsional stresses or strains in a support for the needle bar is removed and consequently movement of parts is more quiet, and objectionable disturbance of the granular carbon in the transmitting cells is less liable to occur or is minimized, and more satisfactory results obtained.

Adjustable dampers 18 are provided at the upper portion of the needle or stylus bar, at opposite sides thereof as indicated in Figure 3 for the purpose of limiting or damping the momentum of the needle or stylus bar where it is connected to the lever which transmits vibrations to the granular carbon of the transmitter cells, and they also serve to position the stylus or needle bar and are adjusted after adjustment of the needle bar fulcrum pads has been effected.

I have illustrated and described the construction which I have found to best give the results sought but variations therefrom may be made without departing from the invention and wherein are embodied features embraced within the scope as sought to be defined by the appended claims.

Having described my invention and set forth its merits, what I claim is:—

1. In a telephonic instrument for reproduction of sound vibrations embodying a sound vibration transmitter; a record stylus operatively connected with the transmitter, a fixed resilient member having a free vibratable end-portion, a stylus-carrying member attached to said resilient member and subject to flexure under movements derived from a record and functioning to absorb initial vibrations received from the record, and a fulcrum for the stylus-carrying and resilient member disposed at opposite sides of the stylus-carrying member and cooperating with the resilient member for transmission of excess vibrations above the initial vibrations derived from the record.

2. In a telephonic instrument for reproduction of sound vibrations embodying a transmitter of sound vibrations and means including a lever for communicating to the transmitter, in a reduced amplitude, sound vibrations received from a record; a record stylus operatively connected with the amplitude reducing means, a fixed resilient member having a free vibratable end-portion, a stylus-carrying member attached to said resilient member subject to flexure under movements derived from a record and functioning to absorb initial vibrations received from the record, and a fulcrum for the stylus-carrying and resilient member disposed in relation to said resilient member to constitute a fulcrum for the member and cooperating with the member for transmission of vibrations derived from the record.

3. In a telephonic instrument for reproduction of sound vibrations embodying a transmitter of sound vibrations and means including a lever for communicating to the transmitter, in a reduced amplitude, sound vibrations received from a record; a record stylus operatively connected with the amplitude reducing means, a fixed resilient member having a free vibratable end-portion, a stylus-carrying member attached to said resilient member subject to flexure under movements derived from a record and functioning to absorb initial vibrations received from the record, fulcrum members positioned at opposite sides of the stylus-carrying member to have said member fulcrum thereon, and means for adjusting said fulcrums relative to the stylus-carrying member to regulate the extent of flexure of the resilient member and the consequent excess vibrations transmitted from the record.

In testimony whereof I affix my signature.

WILLIAM PRESTON STUNZ.